INVENTORS.
JAMES C. BLACKETT
RAYMOND P. FLAGG
WILLIAM L. LIVINGSTON
STUART T. RITCHART

ATTORNEY.

United States Patent Office 3,421,536
Patented Jan. 14, 1969

3,421,536
LIQUID OPERATOR VALVE
James C. Blackett, Rosemount, and Raymond P. Flagg, Golden Valley, Minn., William L. Livingston, Sharon, Mass., and Stuart T. Ritchart, Bloomington, Minn., assignors to Honeywell Inc., Minneapolis, Minn., a corporation of Delaware
Filed Sept. 6, 1966, Ser. No. 577,292
U.S. Cl. 137—253                8 Claims
Int. Cl. F16k 9/00; G05d 16/04

ABSTRACT OF THE DISCLOSURE

A liquid operator valve having a cup-shaped housing including a vent opening in the upper portion of the housing, an inlet and an outlet conduit having terminating ends located adjacent the bottom inside surface of the housing, a liquid within the housing to partially fill the housing and to cover the terminating ends of the inlet and outlet conduit, and means to spin the liquid, causing the liquid to take a generally annular shape where the vent opening is covered by liquid and the terminating ends of the inlet and outlet conduits are uncovered.

---

Our invention is concerned with a valve having liquid as the operator or valving member wherein a unique venting structure is provided to vent leakage which may occur when the valve is closed, the liquid moving to close the vent as it moves to open the valve. The valve of our invention is a dynamic valve, as opposed to a static valve. Continuous motion of the valve operator (liquid) of our valve is necessary to maintain the valve in an open condition. An example of a static valve is a solenoid operated valve which moves a valve operator to a static position away from a valve seat when the valve is open.

Our invention is achieved by the use of a housing having a vent opening at the upper portion of the housing, and having inlet and outlet conduits extend through the housing and terminate adjacent the bottom inside surface of the housing. The liquid operator of our valve is contained within the housing to partially fill the housing and cover the terminating ends of the inlet and outlet conduits. When the liquid seeks its gravity-rest position, the inlet and outlet conduits are covered and the vent opening is uncovered.

In one embodiment of our invention, the housing is rotated about a vertical axis. The liquid is thus subjected to centrifugal force as it spins to take form which uncovers the terminating ends of the conduits and covers the vent opening. The housing must be continuously rotated to maintain the valve in an open position. Any failure of the valve to rotate causes the liquid to assume its gravity-rest position and the valve closes. By the use of our invention, we achieve safe and reliable valving operation. Also, it is not possible for the valve to fail to close once its dynamic operation is interrupted. The liquid operator will always seek its gravity-rest position when rotation stops.

In a second embodiment of our invention, the liquid spins as a result of liquid jets placed in the side of the housing, the housing remaining stationary in this embodiment. In this case the liquid must be continuously pumped to the jets to maintain the valve in an open condition.

We are aware of the use of a centrifugal valve having liquid to control the communication between an inlet and an outlet conduit, see F. R. Belluche U.S. Patent 1,541,318. Our invention resides in a vent structure to safely vent leakage and a liquid operator which closes the vent as it opens the valve. The valve of our invention may be used in a combustion system to control the gas flowing to a burner. If an over-pressure condition of the gas supply occurs while the valve is closed the gas bubbles through the liquid and it is vented. The gas does not pass to the outlet conduit, but rather is vented to a safe area.

Figure 1:
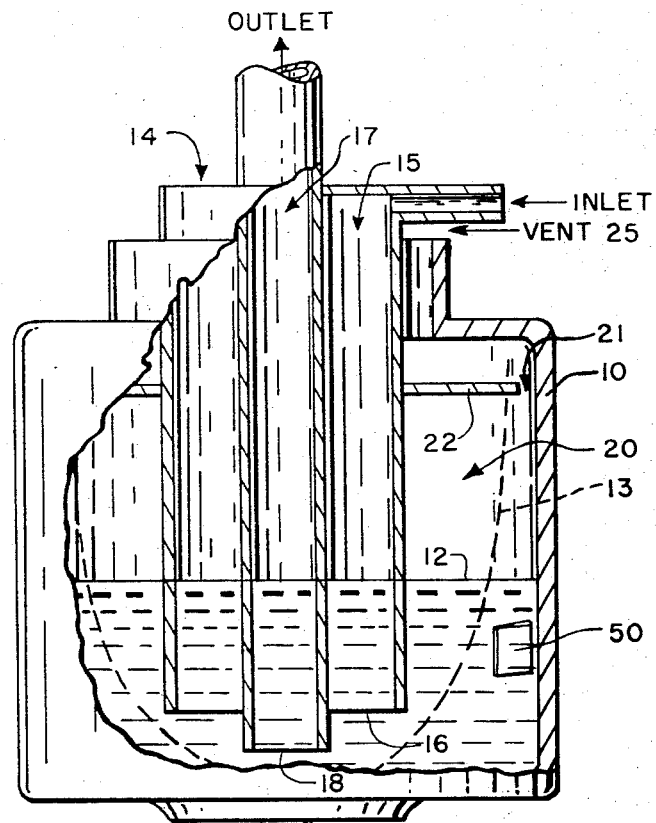
FIGURE 1 shows an embodiment of our invention wherein the housing rotates.

Referring to FIGURE 1, reference numeral 10 designates a generally bowl-shaped housing which is mounted to rotate about a vertical axis upon energization of a motor 11. Housing 10 is shown in a stationary (non-rotating) position in which a liquid 12 assumes a gravity-rest position. When the housing is rotating, the liquid assumes a three-dimensional form generally shown by broken lines curve 13. A number of internally extending fins such as 50 may be provided in the housing to transmit the rotation of the housing to the liquid.

Reference numeral 14 designates a stationary, generally cylindrical housing which includes an inlet conduit 15 having a terminating end 16 and an outlet conduit 17 having a terminating end 18. Conduits 15 and 17 are coaxial. The terminating end 18 of the outlet conduit lies below the terminating end 16 of the inlet conduit such that an over-pressure condition of the gas being valved may cause gas to bubble through the liquid to a vent area 20, however, gas does not pass to the outlet conduit.

Vent area 20 includes an annular-shaped vent opening 21 which is formed by the space between an annular flange 22 formed as a portion of member 14 and the inside surface of the upper portion of housing 10. With the liquid in the gravity-rest position, vent opening 21 is open. When the liquid assumes a position represented by the broken line 13, vent opening 21 is closed. Vent opening 21 communicates with vent 25, located at the upper portion of housing 10.

Upon energization of motor 11, as by a logic network indicating a need for communication between the inlet conduit and the outlet conduit, housing 10 rotates, causing liquid 12 to be subjected to centrifugal force and to assume the general form represented by the broken line 13. The gas being valved then flows from inlet conduit 15 out through outlet conduit 17, vent opening 21 being blocked by the upper portion of the liquid form.

Figure 2:
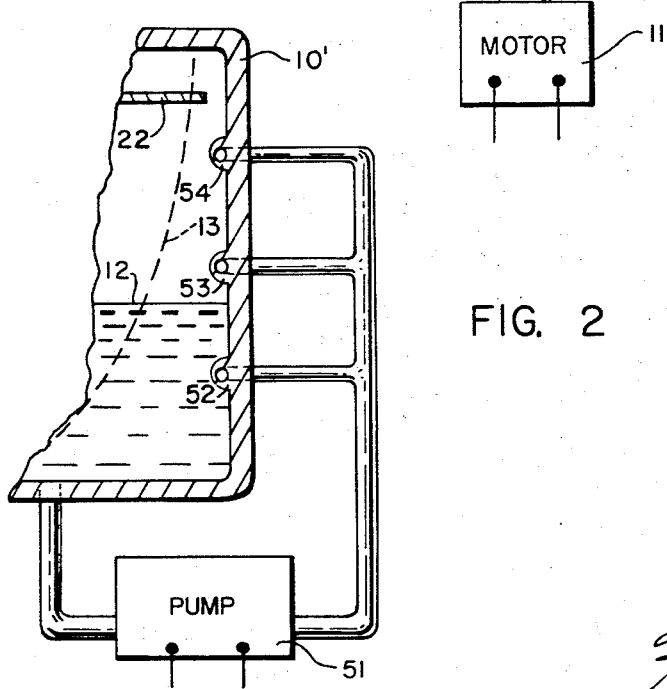
FIGURE 2 shows an embodiment of our invention wherein the housing is stationary and liquid jets are used to spin the liquid.

It is also possible to spin liquid 12 by the use of a pump 51 (FIGURE 2), which injects liquid into the housing 10' by means of jets 52, 53, and 54, which inject the liquid tangentially into the housing, causing the liquid to spin within the bowl-shaped housing, assuming the three-dimensional form generally shown by broken line curve 13. In the embodiment of FIGURE 2, pump 52 is engaged upon a need to open the valve. The inlet and outlet structure of FIGURE 2 is identical to that of FIGURE 1, and, as mentioned, housing 10 is stationary. The fins 50 are removed from the housing of FIGURE 2.

We claim as our invention:
1. A valve, comprising:
  a housing including a vent opening located in an upper portion of the housing, an inlet conduit extending through the housing and having a terminating end located adjacent the bottom inside surface of the housing, and an outlet conduit extending through the housing and having a terminating end located adjacent the bottom inside surface of the housing,
  a liquid contained within the housing to partially fill the housing and to cover the terminating ends of said inlet and outlet conduits and to uncover said vent opening when said liquid seeks a level determined by the force of gravity acting on the liquid, and controllable means effective to act on the liquid, to cause the liquid to take a form which uncovers the terminating ends of said inlet and outlet conduits, and covers said vent opening.

2. A valve as defined in claim 1 wherein said controllable means is effective to spin said liquid and wherein the resultant centrifugal force causes the liquid to take said form.

3. A valve as defined in claim 2 including motor means coupled to said housing to rotate said housing and said liquid about a generally vertical axis to produce said centrifugal force.

4. A valve as defined in claim 2, including a pump means, is coupled to said housing to pump said liquid out of said housing and then inject said liquid into said housing tangentially about a generally vertical axis to produce said centrifugal force.

5. A valve as defined in claim 1 wherein the terminating end of said outlet conduit extends below the terminating end of said outlet conduit.

6. A valve as defined in claim 1 wherein said inlet and outlet conduits are portions of a stationary structure, wherein said housing is rotatable to produce a centrifugal force causing said liquid to take an annular form, and wherein said vent opening is formed by a space existing between said stationary structure and the upper portion of said housinng, which space is occupied by the upper portion of said annular form of said liquid.

7. A valve as defined in claim 5 wherein said terminating ends of said inlet and outlet conduits are located in alignment with the axis of rotation of said housing.

8. A valve as defined in claim 6 wherein said axis of rotation is generally vertical and said inlet and outlet conduits are co-axial and in alignment with said axis.

References Cited

UNITED STATES PATENTS

| | | | |
|---|---|---|---|
| 1,541,318 | 6/1925 | Belluche | 137—47 |
| 1,910,012 | 5/1933 | Halsey | 137—253 X |

NATHAN L. MINTZ, *Primary Examiner.*

U.S. Cl. X.R.

137—47